Patented Mar. 7, 1933

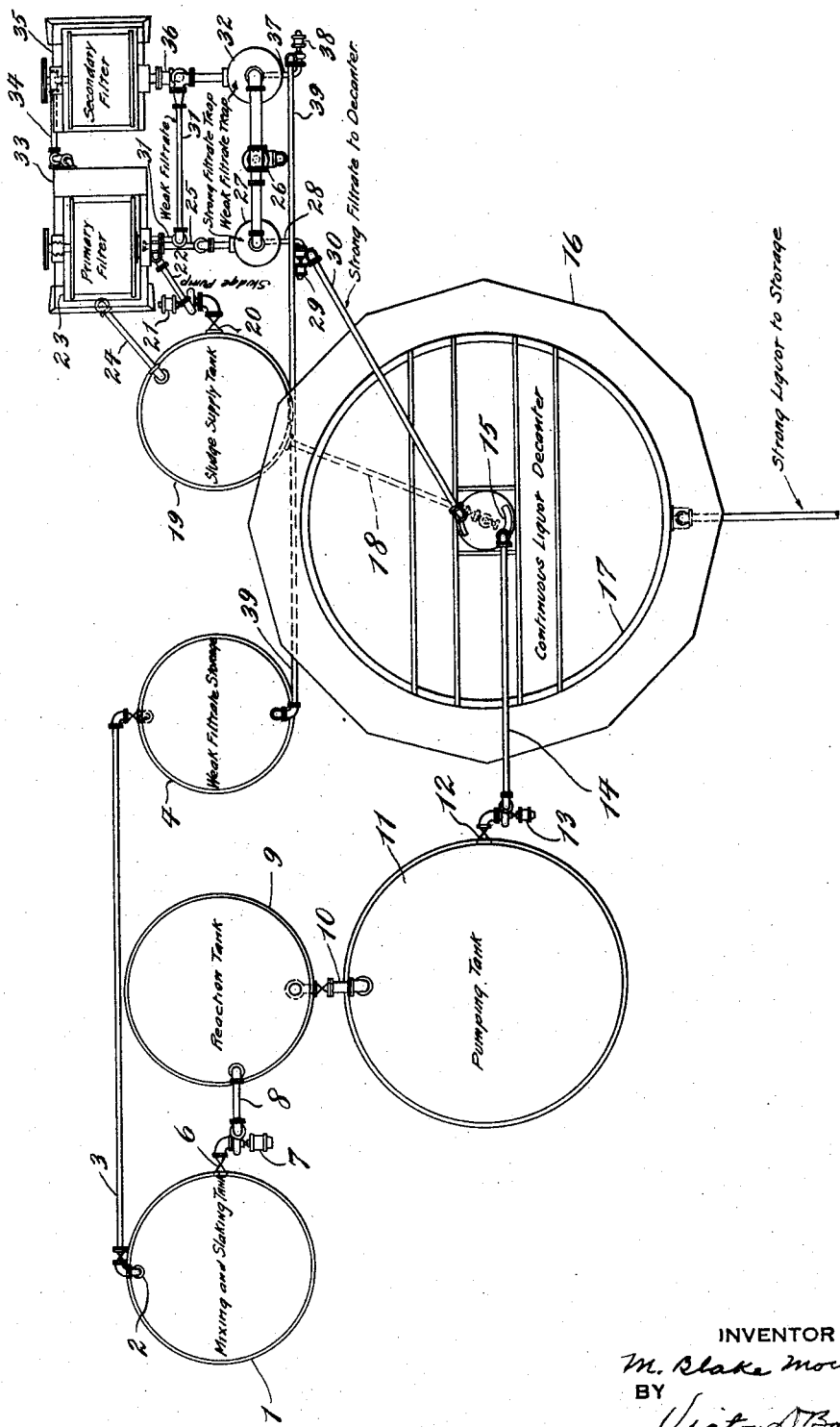

1,900,253

UNITED STATES PATENT OFFICE

MORRIS BLAKE MOUNT, OF LYNCHBURG, VIRGINIA

PREPARATION OF CAUSTIC LIQUOR

Application filed November 11, 1930. Serial No. 494,915.

Heretofore, there have been two processes for the preparation of caustic liquor in common use, the batch process and the continuous process. In the first of these processes, that is, the batch process, the liquor is made in quantities or batches. The operation of the batch process is necessarily intermittent, but its appeal lies in its simplicity, which permits the operation of the process with the minimum amount of attention from the operators. In the latter process, namely, the continuous process, all of the operations proceed at a definite rate, the materials entering at one end and the caustic liquor and sludge being withdrawn at the opposite end. Both of these processes are fundamentally the same in that liquor is causticized and the caustic liquor produced is clarified. The clarification of the caustic liquor consists in separating the sludge and the liquor, and it is commonly accomplished by decantation. The sludge remaining after the caustic liquor is decanted, contains a considerable quantity of strong caustic liquor which in existing systems is diluted with wash water used to recover the alkali remaining in the sludge, and it is to a process for the preparation of caustic liquor in which an increased yield of strong caustic liquor is obtained by recovering much of the caustic liquor in the sludge as strong caustic liquor, that my invention relates.

By the process of my invention I obtain a considerably greater percentage of the total volume of liquor causticized as strong caustic liquor. I obtain this increased yield of strong caustic liquor by filtering the sludge which remains after decanting the clear caustic liquor. The sludge is filtered without the addition of wash water so that strong caustic liquor is obtained as a filtrate. This filtrate is clarified by eliminating the sediment contained therein.

An advantage of the process of my invention is the fact that it tends greatly to simplify the handling of the chemicals. I obtain this advantage by combining the batch process with the continuous process, thereby obtaining the simplicity of operation of the batch process and the continuity of operation and efficiency of the continuous process. The entire process is carried on in a closed cycle which greatly reduces the alkali losses.

In combining the batch and continuous processes, lime is slaked, in successive batches, in a mixing and slaking tank with predetermined volumes of sodium carbonate solution and weak filtrate which in the closed cycle is returned to this tank, as will hereinafter appear. The mixture is agitated during the slaking of the lime. The carbonate and milk of lime mixture formed in the slaking tank is then causticized. Successive batches of caustic liquor and sludge are delivered to a storage or pumping tank wherein the mixture of the caustic liquor and the sludge is continuously agitated to maintain the sludge in suspension. From the pumping tank, the mixture of caustic liquor and sludge is continuously withdrawn and delivered to a continuous decanter wherein the sludge settles and clear caustic liquor is decanted and sent to storage. The sludge is continuously removed from the decanter as it settles and is continuously filtered, as, for example, in a continuous filter. The filtrate obtained from this filtering of the sludge is strong caustic liquor and is returned to the decanter where any sediment contained therein is removed therefrom. The cake formed on the continuous filter is washed with washing water and delivered to a resludger where it is repulped with water. The repulped sludge is again filtered, a weak filtrate being obtained. This weak filtrate is delivered to the slaking tank where it is used in slaking the lime.

I shall now describe the embodiment of the apparatus shown in the accompanying drawing for carrying out my process, in which the single figure diagrammatically represents the arrangement of the apparatus.

The apparatus shown in the drawing is illustrated diagrammatically as the apparatus shown there in is, in the main, standard equipment in the alkali industry, and the novelty resides in the combination and arrangement thereof. Lime is slaked in the mixing and slaking tank 1 with predetermined volumes of a carbonate solution and weak filtrate or wash water. The weak filtrate is introduced through an inlet 2 which is connected to a conduit 3 through which the weak filtrate or wash water for slaking the lime is delivered from a weak filtrate storage tank 4. The tank is of a type well known in the alkali industry and is equipped with a perforated plate on to which the mixture of lime is dumped. All of the lime which passes through the perforations in the plate is carried through the system. The tank 1 is also equipped with a low speed agitator for agitating the mixture in the tank, and a drag for reducing lumps of lime so that they will pass through the perforations in the plate onto which the lime is dumped. When the desired strength of the milk of lime mixture has been obtained, the charge is withdrawn through an outlet 6 by a pump 7 and is delivered through a conduit 8 to a reaction tank 9 where causticization is completed.

The reaction tank is completely enclosed and is equipped with a high speed agitator so that a positive and thorough mixing of the chemicals is obtained. In addition to being thoroughly agitated in the reaction tank, the milk of lime mixture delivered thereto is heated, preferably by steam. The agitation of the mixture during the causticization in the reaction tank is a very important feature and for this reason the agitation should be positive and thorough. It is a known fact that with suitable agitation in the reaction tank, the steam used in heating the mixture may be confined to the amount required to raise the charge to the boiling point and maintain it at that temperature during the reaction period and an increased conversion to caustic liquor will be obtained.

In the reaction tank shown, the mixture is continuously agitated for a suitable period, approximately twenty or thirty minutes, and is then delivered through a conduit 10 to a storage or pumping tank 11. The reaction tank may be located at a higher level than the pumping tank in which case the liquor would flow through the conduit 10 under the action of gravity. The pumping tank is equipped with a low speed agitator which agitates the mixture therein to maintain the sludge in suspension. The liquor with the sludge in suspension is continuously withdrawn from the pumping tank through an outlet 12 by a pump 13 and delivered through a conduit 14 to the central well 15 of a continuous decanter 16. The rate at which the causticized liquor and sludge is delivered to the decanter is determined by the total volume to be handled in a given period of time.

A continuous separation of the clear caustic liquor and the sludge is obtained in the continuous decanter. The clear caustic liquor overflows into a launder 17 surrounding the top rim of the decanter from whence it is withdrawn and delivered to the caustic liquor storage. The sludge settles to the bottom of the decanter and flows under the action of the force of gravity through the conduit 18 to a sludge supply tank 19 which is equipped with a low speed agitator.

The sludge withdrawn from the continuous decanter is undiluted and the consistency of the sludge is approximately 25% solids and 75% strong caustic liquor by volume, and represents 45 to 50% of the total volume of liquor causticized. The ratio of the solids to the liquor in the sludge withdrawn from the continuous decanter may be controlled within definite predetermined limits.

From the sludge supply tank, the sludge is withdrawn through an outlet 20 by a pump 21 and delivered through a conduit 22 to a primary filter 23. The sludge is pumped at a continuous rate to this filter which is a continuous filter of the compartment type. The filter is equipped with an overflow which is connected to the sludge supply tank by means of a conduit 24. Thus, any sludge overflowing the filter will be returned to the sludge supply tank. Although any suitable type of filter may be used I prefer to use the continuous, compartment type rotary vacuum filter, such as that which forms the subject matter of my copending application Serial No. 505,509 filed Dec. 30, 1930. With this type of filter undiluted caustic liquor may be drawn through each compartment during that portion of each revolution of the drum in which the compartment is submerged and wash water may be supplied to the sludge on the filter during each revolution of the drum, the weak filtrate being withdrawn through the compartments during that portion of each revolution of the drum in which the compartment is not submerged. The filtrate obtained through the submerged portion of the filter drum is undiluted and is the strong caustic liquor carried by the sludge. This filtrate is withdrawn through a conduit 25 by means of a vacuum pump 26 which is connected to the conduit 25 through a trap 27. In the trap 27, the strong filtrate is prevented from passing through the trap to the vacuum pump. The strong filtrate is withdrawn from the trap 27 through a conduit 28 by means of a pump 29 and is delivered through a conduit 30 to the central well 15 of the continuous decanter where any small amount of sediment which it may contain is removed. The recovery of the additional volume of undiluted liquor is one of the principal characteristics of this process. The volume of strong caustic liquor obtained by decantation plus that recovered as strong filtrate represents 70 to 75 per cent of the total volume of liquor causticized which represents an increased yield of strong caustic liquor of approximately 20 to 25% over the processes heretofore in use.

As hereinbefore observed, the cake formed on the primary filter is given a preliminary washing on the upper portion of the drum. The wash water or weak filtrate is withdrawn from the filter through a conduit 31 which is connected through a weak filtrate trap 32 to the vacuum pump 26.

Following the preliminary washing on the upper portion of the primary filter drum the cake is repulped with hot water in a resludger 33 from which it is withdrawn and delivered through a conduit 34 to a secondary filter 35 where it is given a final washing. The weak filtrate from this secondary filter is withdrawn through a conduit 36 which is connected to the conduit 31 through which the weak filtrate from the primary filter is delivered to the weak filtrate trap 32. The weak filtrate is withdrawn from the trap 32 through a conduit 37 by a pump 38 and delivered through a conduit 39 to the weak filtrate storage tank 4 from which it is withdrawn as needed to be used in the slaking of lime in the mixing and slaking tank 1.

The filtered cake is washed to remove as much of the alkali content as possible. In the process described the final alkali content of the filter cake is reduced to one-half of one per cent or less. The filter cake as it is removed from the secondary filter may be discarded or reburned in a lime recovery kiln to reduce the carbonate to lime. Where a lime recovery kiln is provided, the filters may be located directly over the feed end of the kiln.

The process described in detail above permits a positive control over the slaking operation and the preparation of a milk of lime mixture that is chemically and physically suited to the causticizing operation; it permits a high degree of control over causticity; it permits a chemical control throughout the process of a type that can be exercised by the operatives in charge with a minimum amount of supervision; and, it provides a positive circulation of the material in the reaction tank. In the process, there is a greatly decreased steam consumption; the amount of core that must be removed from the slaking tank is materially reduced; there is a continuous and thorough settling of the sludge and a minimum alkali loss in the discarded sludge. The cycle described is a closed cycle and therefore eliminates the possibility of losing charges of the liquor through carelessness of the operators. The system also has the advantage in that there is a minimum handling of chemicals; a minimum dilution of chemicals; and a low cost of installation and operation, coupled with a recovery of over 70 to 75% of the total volume of liquor causticized.

It will be obvious that various changes may be made in the steps of my process and the apparatus described immediately above within the principle and scope of my invention as expressed in the appended claims.

I claim:

1. The process for the preparation of caustic liquor which consists in treating successive batches of liquor containing soda ash by slaking lime therein, causticizing the milk of lime mixture, delivering the successive batches of the causticized milk of lime mixture and sludge to a tank, continuously withdrawing the liquor and sludge from the tank and delivering it to a continuous decanter, and continuously decanting the clear caustic liquor.

2. The process for the preparation of caustic liquor which consists in treating successive batches of liquor containing soda ash by slaking lime therein, causticizing the milk of lime mixture, delivering the successive batches of caustic liquor and sludge to a storage tank, continuously withdrawing the liquor and sludge from the storage tank and delivering it to a continuous decanter, continuously decanting the clear caustic liquor, continuously removing the sludge from the decanter, filtering the sludge as it comes from the decanter, and eliminating the sediment in the filtrate to obtain clear caustic liquor.

3. The process for the preparation of caustic liquor which consists in treating successive batches of liquor containing soda ash by slaking lime therein, causticizing the milk of lime mixture, delivering the successive batches of caustic liquor and sludge to a tank, continuously withdrawing the liquor and sludge from the tank and delivering it to a continuous decanter, continuously decanting the clear caustic liquor, continuously removing the sludge from the decanter, and filtering the sludge removed from the decanter.

4. The process for the preparation of caustic liquor which consists in treating successive batches of liquor containing soda ash by slaking lime therein, causticizing the milk of lime mixture, delivering the successive batches of caustic liquor and sludge to a storage tank, continuously withdrawing the liquor and sludge from the storage tank and delivering it to a continuous decanter, continuously decanting the clear caustic liquor, continuously removing the sludge from the decanter, filtering the sludge as it comes from the decanter, eliminating the sediment in the filtrate to obtain clear caustic liquor, washing the sludge removed by the filter, and filtering the wash water from the sludge.

5. The process for the preparation of caustic liquor which consists in treating successive batches of liquor containing soda ash by slaking lime therein, causticizing the milk of lime mixture, delivering the successive batches of caustic liquor and sludge to a tank, continuously withdrawing the liquor and sludge from the tank and delivering it to a continuous decanter, continuously decanting the clear caustic liquor, continuously removing the sludge from the decanter, filtering the sludge removed from the decanter, and returning the filtrate to the decanter.

6. The process for the preparation of caustic liquor which consists in treating successive batches of liquor containing soda ash by slaking lime therein, causticizing the milk of lime mixture, delivering the successive batches of caustic liquor and sludge to a storage tank, continuously withdrawing the liquor and sludge from the storage tank and delivering it to a continuous decanter, continuously decanting the clear caustic liquor, continuously removing the sludge from the decanter, filtering the sludge as it comes from the decanter, eliminating the sediment in the filtrate to obtain clear caustic liquor, washing the sludge removed by the filter, filtering the wash water from the sludge, and using the filtered wash water in the slaking of the lime.

7. The process for the preparation of caustic liquor which consists in treating successive batches of liquor containing soda ash by slaking lime therein, causticizing the milk of lime mixture, delivering the successive batches of caustic liquor and sludge to a tank, continuously withdrawing the liquor and sludge from the tank and delivering it to a continuous decanter, continuously decanting the clear caustic liquor, continuously removing the sludge from the decanter, filtering the sludge removed from the decanter, returning the filtrate to the decanter, washing the sludge removed by the filter, filtering the washing water from the sludge, and using the filtered washing water for the slaking of lime.

8. The process for the preparation of caustic liquor which consists in treating successive batches of liquor containing soda ash by slaking lime therein, agitating the liquor during the slaking of the lime, causticizing the soda ash in the milk of lime mixture formed by slaking the lime in the liquor containing the soda ash, continually agitating the milk of lime mixture during the causticization thereof, delivering the successive batches of caustic liquor and sludge to a tank, agitating the caustic liquor in the tank to maintain the sludge in suspension, continuously withdrawing the liquor and sludge from the tank and delivering it to a continuous decanter, continuously decanting the clear caustic liquor, continuously removing the sludge from the decanter, filtering the sludge removed from the decanter, and returning the filtrate to the decanter.

9. The process for the preparation of caustic liquor which consists in treating successive batches of liquor containing soda ash by slaking lime therein, agitating the liquor during the slaking of the lime, causticizing the soda ash in the milk of lime mixture formed by slaking the lime in the liquor containing the soda ash, continually agitating the milk of lime mixture during the causticization thereof, delivering the successive batches of caustic liquor and sludge to a tank, agitating the caustic liquor in the tank to maintain the sludge in suspension, continuously withdrawing the liquor and sludge from the tank and delivering it to a continuous decanter, continuously decanting the clear caustic liquor, continuously removing the sludge from the decanter, filtering the sludge removed from the decanter, returning the filtrate to the decanter, washing the sludge removed from the filter, filtering the washing water from the sludge, and mixing the washing water with the liquor containing the soda ash during the slaking of lime.

10. In a process for the preparation of a caustic liquor, the steps consisting of continuously separating the caustic liquor from the caustic sludge by decantation in a continuous decanter, continuously removing the sludge from the decanter, filtering the sludge as it is removed from the decanter, and eliminating the sediment in the filtrate.

11. In the process for the preparation of a caustic liquor, the steps consisting of continuously separating the caustic liquor from the caustic sludge by decantation in a continuous decanter, continuously removing the sludge from the decanter, filtering the sludge removed from the decanter, and returning the filtrate to the decanter.

12. In the process for the preparation of a caustic liquor, the steps consisting of continuously separating the caustic liquor from the caustic sludge by decantation in a continuous decanter, continuously removing the sludge from the decanter, filtering the sludge removed from the decanter, returning the filtrate to the decanter, washing the sludge removed by the filter, filtering the washing water from the sludge, and using the washing water for slaking lime.

In witness whereof, I hereunto subscribe my signature.

MORRIS BLAKE MOUNT.